(12) United States Patent
Hung et al.

(10) Patent No.: US 7,635,458 B1
(45) Date of Patent: Dec. 22, 2009

(54) PRODUCTION OF ULTRAFINE BORON CARBIDE PARTICLES UTILIZING LIQUID FEED MATERIALS

(75) Inventors: Cheng-Hung Hung, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 521 days.

(21) Appl. No.: 11/468,424

(22) Filed: Aug. 30, 2006

(51) Int. Cl.
*C01B 31/36* (2006.01)

(52) U.S. Cl. .................................. 423/291

(58) Field of Classification Search ........... 423/291, 423/439, 345, 440
See application file for complete search history.

(56) References Cited

U.S. PATENT DOCUMENTS

| | | | |
|---|---|---|---|
| 3,379,647 A | 4/1968 | Smudski | 252/301.1 |
| 3,885,022 A | 5/1975 | Harris et al. | 423/291 |
| 4,804,525 A | 2/1989 | Rafaniello et al. | 423/291 |
| 4,851,262 A | 7/1989 | McFeaters | |
| 5,486,675 A | 1/1996 | Taylor et al. | 217/121.59 |
| 5,749,937 A | 5/1998 | Detering et al. | |
| 5,788,738 A | 8/1998 | Pirzada et al. | |
| 5,851,507 A | 12/1998 | Pirzada et al. | |
| 5,935,293 A | 8/1999 | Detering et al. | |
| 5,984,997 A | 11/1999 | Bickmore et al. | |
| 5,989,648 A | 11/1999 | Phillips | |
| 6,228,904 B1 | 5/2001 | Yadav et al. | |
| RE37,853 E | 9/2002 | Detering et al. | |
| 6,652,967 B2 | 11/2003 | Yadav et al. | |
| 6,669,823 B1 | 12/2003 | Sarkas et al. | |
| 6,689,192 B1 | 2/2004 | Phillips et al. | |
| 6,716,525 B1 | 4/2004 | Yadav et al. | |
| 6,719,821 B2 | 4/2004 | Yadav et al. | |
| 6,786,950 B2 | 9/2004 | Yadav et al. | |
| 6,821,500 B2 | 11/2004 | Fincke et al. | |
| 6,830,822 B2 | 12/2004 | Yadav | |
| 6,849,109 B2 | 2/2005 | Yadav et al. | |
| 2007/0044513 A1 * | 3/2007 | Kear et al. | 65/17.6 |
| 2007/0292340 A1 * | 12/2007 | Plischke et al. | 423/613 |

FOREIGN PATENT DOCUMENTS

| | | |
|---|---|---|
| CS | 296 678 B6 | 3/2006 |
| JP | 63-170212 | 7/1988 |
| JP | 1-290565 | 11/1989 |
| WO | WO 96/28577 | 9/1996 |

OTHER PUBLICATIONS

Kostic et al., "Thermodynamic Consideration of B-O-C-H System for Boron Carbide (B4C) Powder Synthesis in Thermal Plasma," 1997, Progress in Plasma Processing of Materials, pp. 889-898.*

(Continued)

*Primary Examiner*—Wayne Langel
*Assistant Examiner*—Brittany M Martinez
(74) *Attorney, Agent, or Firm*—Donald R. Palladino

(57) ABSTRACT

The production of ultrafine boron carbide powders from liquid boron-containing precursors and/or liquid carbon-containing precursors is disclosed. The liquid precursors are fed together or separately to a plasma system where the precursor materials react to form boron carbide in the form of ultrafine particles.

21 Claims, 8 Drawing Sheets

OTHER PUBLICATIONS

N. R. Thakkar et al., "Thermal Plasma Processing of Boron Carbide Fine Powders", Materials Science and Technology 2003 Meeting—Powder Materials: Current Research and Industrial Practices III 2003, Minerals, Metals and Materials Society, US, 2003, pp. 47-60.

V. P. Elyutin et al., "Plasma-Chemical Synthesis of Ultradisperse Boron Carbide and Its Properties" & Doklady Akademii Nauk SSSR, 316(5), 1125-30 (Tech. Phys.] CODEN: DANKAS; ISSN: 0002-3264, 1991.

T. Ishigaki et al., "Controlling the Synthesis of TaC Nanopowders by Injecting Liquid Precursor into RF Induction Plasma", Science and Technology of Advanced Materials—21$^{st}$ Century Coe Program, Nagaoka University of Technology, Hybridized Materials with Super Functions Mar. 2005, Elsevier; LTD GB, vol. 6, No. 2, Mar. 2005, pp. 111-118.

V. F. Rezvykh et al., "Effect of the Conditions of Introduction of the Starting Material on the Process of Synthesis of Titanium Carbide", Physics and Chemistry of Materials Treatment UK, vol. 17, No. 2, Mar. 1983, pp. 177-180.

Taylor, "The surface composition of silicon carbide powders and whiskers: An XPS study", J. Mater. Res., Jan./Feb. 1989, pp. 189-203, vol. 4, No. 1.

Allaire et al., "Factors influencing the crystallization of ultrafine plasma-synthesized silicon nitride as a single powder and in composite SiC-Si3N4 powder", J. Mat. Sci., 1992, pp. 1265-1270, vol. 27.

Tartaj et al., "Electrokinetic Behavior and Stability of Silicon Carbide Nanoparticulate Dispersions", J. Am. Ceram. Soc., 1998, pp. 389-394, vol. 81, No. 2.

* cited by examiner

PRODUCTION OF ULTRAFINE BORON CARBIDE PARTICLES UTILIZING LIQUID FEED MATERIALS

GOVERNMENT CONTRACT

This invention was made with United States government support under Contract Number W911NF-05-9-0001 awarded by DARPA. The United States government has certain rights in this invention.

FIELD OF THE INVENTION

The present invention relates to boron carbide particles, and more particularly relates to the production of ultrafine boron carbide particles utilizing liquid feed materials.

BACKGROUND INFORMATION

Micron-sized boron carbide particles have been produced by solid phase synthesis using $B_2O_3$ and carbon as the starting reactant materials.

Boron carbide particles have also been produced by vapor phase synthesis using $BCl_3$ and $CH_4$ gaseous reactants as the starting materials. Although such vapor phase synthesis is capable of producing $B_4C$ nanoparticles, the process is relatively expensive.

SUMMARY OF THE INVENTION

In certain respects, the present invention is directed to a method for making ultrafine boron carbide particles comprising: introducing a liquid boron-containing precursor and a carbon-containing precursor into a plasma; heating the precursors by the plasma to form the ultrafine boron carbide particles from the precursors; and collecting the ultrafine boron carbide particles.

In other respects, the present invention is directed to a method for making ultrafine boron carbide particles comprising: introducing a boron-containing precursor and a liquid carbon-containing precursor into a plasma; heating the precursors by the plasma to form the ultrafine boron carbide particles from the precursors; and collecting the ultrafine boron carbide particles.

In other respects, the present invention is directed to an apparatus for making ultrafine boron carbide particles comprising: a source of liquid boron-containing precursor; a source of carbon-containing precursor; a plasma chamber; and at least one feed line for delivering the precursors to the plasma chamber.

In further respects, the present invention is directed to ultrafine boron carbide particles made from such methods and apparatus.

DETAILED DESCRIPTION

Figure 1:
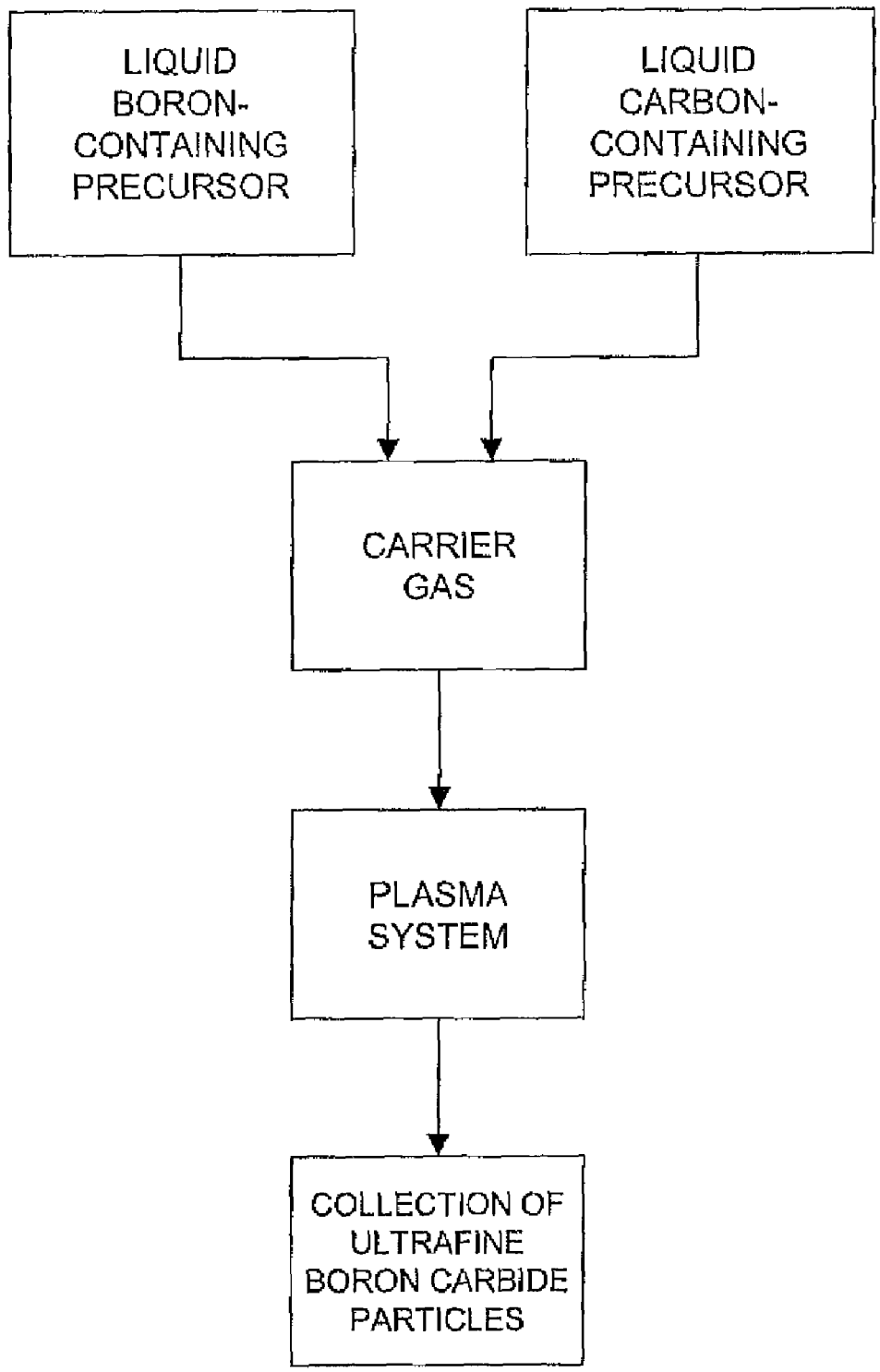
FIG. 1 is a flowchart depicting the steps of certain methods of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to methods and/or apparatus for making ultrafine boron carbide particles, as well as the ultrafine boron carbide particles produced by such methods and apparatus. Examples of ultrafine boron carbides that may be produced include $B_4C$, $B_{13}C_2$, $B_8C$, $B_{10}C$, $B_{25}C$, and any other boron carbides that may be produced as ultrafine particles utilizing a liquid boron-containing precursor as the boron source and/or a liquid carbon-containing precursor as the carbon source for the boron carbide. In certain embodiments, the ratio of boron-containing precursor to carbon-containing precursor is selected in order to control the boron carbide composition.

For example, increasing the boron to carbon ratio in the precursors may result in the formation of $B_8C$ or $B_{10}C$ rather than $B_4C$.

As used herein, the term "ultrafine boron carbide particles" refers to boron carbide particles having a B.E.T. specific surface area of at least 5 square meters per gram, such as 20 to 200 square meters per gram, or, in some cases, 30 to 100 square meters per gram. As used herein, the term "B.E.T. specific surface area" refers to a specific surface area determined by nitrogen adsorption according to the ASTM D 3663-78 standard based on the Brunauer-Emmett-Teller method described in the periodical "The Journal of the American Chemical Society", 60, 309 (1938).

In certain embodiments, the ultrafine boron carbide particles made in accordance with the present invention have a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter (nanometers)} = 6000/[BET(m^2/g) * \rho(grams/cm^3)]$$

In certain embodiments, the ultrafine boron carbide particles have an average particle size of no more than 100 nanometers, in some cases, no more than 50 nanometers or, in yet other cases, no more than 30 or 40 nanometers. As used herein, the term "average particle size" refers to a particle size as determined by visually examining a micrograph of a transmission electron microscopy ("TEM") image, measuring the diameter of the particles in the image, and calculating the average particle size of the measured particles based on magnification of the TEM image. One of ordinary skill in the art will understand how to prepare such a TEM image and determine the average particle size based on the magnification. The size of a particle refers to the smallest diameter sphere that will completely enclose the individual particle.

FIG. 1 is a flow diagram depicting certain embodiments of the methods of the present invention. A liquid boron-containing precursor and a liquid carbon-containing precursor are provided as feed materials. In the embodiment shown in FIG. 1, the liquid precursors are provided from separate sources. However, a single liquid comprising both the boron-containing precursor and carbon-containing precursor may also be used. The term "liquid precursor" means a precursor material that is liquid at room temperature.

In accordance with certain embodiments, suitable liquid boron-containing precursors include borate esters and other compounds containing boron-oxygen bonds. For example, the liquid boron-containing precursor may comprise trimethylboroxine, trimethylborate and/or triethylborate.

In certain embodiments, the carbon-containing precursor may be in liquid form and may comprise aliphatic carbon atoms and/or aromatic carbon atoms. For example, the liquid carbon-containing precursor may comprise acetone, iso-octane and/or toluene. In certain embodiments, the liquid carbon-containing precursor may also be a source of nitrogen. Examples of such materials include, but are not limited to, dimethylformamide and methylformamide. In certain embodiments, the liquid carbon-containing precursor may comprise an organic liquid with a relatively high C:H atomic ratio, e.g., greater than 1:3 or greater than 1:2. Furthermore, such liquid hydrocarbon precursors may also have a relatively high C:O atomic ratio, e.g., greater than 2:1 or greater than 3:1.

In certain embodiments, a single liquid may be provided as the feed material. For example, boron-containing compounds such as $B_2O_3$ or borax particles may be suspended or dissolved in an organic liquid such as methanol, glycerol, ethylene glycol or dimethyl carbonate. Thus, the liquid boron-containing precursor and liquid carbon-containing precursor may comprise hydrocarbon solvents in which particulate boron-containing precursors are at least partially suspended or dissolved. As another example, polypropylene powder may be suspended in trimethylborate liquid.

In accordance with certain embodiments, the ratio of boron-containing precursor to carbon-containing precursor is controlled in order to control the composition of the resultant boron carbide and/or in order to control the formation of excess boron or excess carbon in the ultrafine boron carbide particles. For example, if an excess amount of boron-containing precursor is used, excess boron may form on or in the ultrafine boron carbide particles, which may react with oxygen or air to form oxide compounds. As a further example, an excess amount of carbon-containing precursor in the starting feed material may cause the formation of graphite on or in the resultant boron carbide particles.

As shown in FIG. 1, in accordance with certain methods of the present invention, the liquid boron-containing and carbon-containing precursors are contacted with a carrier. The carrier may be a gas that acts to suspend or atomize the liquid precursors in the gas, thereby producing a gas-stream in which the liquid precursors are entrained. Suitable carrier gases include, but are not limited to, argon, helium, nitrogen, hydrogen, or a combination thereof.

Next, in accordance with certain embodiments of the present invention, the precursors are heated by a plasma system, e.g., as the entrained liquid precursors flow into a plasma chamber, yielding a gaseous stream of the precursors and/or their vaporized or thermal decomposition products and/or their reaction products. In certain embodiments, the precursors are heated to a temperature ranging from 1,500° to 20,000° C., such as 1,700° to 8,000° C.

In certain embodiments, the gaseous stream may be contacted with other reactants or dopants, such as tetramethoxy silane, tetraethoxy silane, alkoxy titanates or dimethyl formamide or nitrogen, that may be injected into the plasma chamber or which may be introduced as part of the liquid precursors. For example, the additional reactants may be used to increase the yield and/or purity of $B_4C$, e.g., by reducing carbothermal reactions which would otherwise tend to form $B_2O_3$ and graphite. Furthermore, the additional reactants may result in improved physical properties of the $B_4C$ such as mechanical properties and the like. The additional reactants may result in the formation of additional boron-containing compounds and/or additional carbon-containing materials or compounds. For example, silanes may be used to produce silicon carbide on or in the ultrafine boron carbide particles. Suitable additional reactant materials include, but are not limited to, hydrogen, nitrogen, ammonia, nitrogen-containing organic compounds, silicon-containing compounds, polymers, alkoxy metal compounds and/or metal carboxylates.

In certain methods of the present invention, after the gaseous stream is produced, it is contacted with one or more quench streams that are injected into the plasma chamber through at least one quench stream injection port. For example, the quench streams are injected at flow rates and injection angles that result in impingement of the quench streams with each other within the gaseous stream. The material used in the quench streams is not limited, so long as it adequately cools the gaseous stream to facilitate the formation or control the particle size of the ultrafine boron carbide particles. Materials suitable for use in the quench streams include, but are not limited to, inert gases such as argon, helium, nitrogen, hydrogen gas, ammonia, mono, di and polybasic alcohols, hydrocarbons, amines and/or carboxylic acids.

In certain embodiments, the particular flow rates and injection angles of the various quench streams may vary, so long as they impinge with each other within the gaseous stream to result in the rapid cooling of the gaseous stream. For example, the quench streams may primarily cool the gaseous stream through dilution, rather than adiabatic expansion, thereby causing a rapid quenching of the gaseous stream, before, during and/or after the formation of the ultrafine boron carbide particles prior to passing the particles into and through a converging member, such as a converging-diverging nozzle, as described below.

In certain embodiments of the invention, after contacting the gaseous product stream with the quench streams to cause production of ultrafine boron carbide particles, the ultrafine particles may be passed through a converging member, wherein the plasma system is designed to minimize the fouling thereof. In certain embodiments, the converging member comprises a converging-diverging (De Laval) nozzle. In these embodiments, while the converging-diverging nozzle may act to cool the product stream to some degree, the quench streams perform much of the cooling so that a substantial amount of the ultrafine boron carbide particles are formed upstream of the nozzle. In these embodiments, the converging-diverging nozzle may primarily act as a choke position that permits operation of the reactor at higher pressures, thereby increasing the residence time of the materials therein. The combination of quench stream dilution cooling with a converging-diverging nozzle appears to provide a commercially viable method of producing ultrafine boron carbide particles from liquid boron-containing and carbon-containing precursors using a plasma system, since, for example, in certain embodiments the liquid feed materials can be used effectively without the necessity of heating the feed materials to a gaseous state before injection into the plasma. Alternatively, liquid feed materials may be vaporized prior to introduction to the plasma system.

As is seen in FIG. 1, in certain embodiments of the methods of the present invention, after the ultrafine boron carbide particles exit the plasma system, they are collected. Any suitable means may be used to separate the ultrafine boron carbide particles from the gas flow, such as, for example, a bag filter, cyclone separator or deposition on a substrate.

Figure 2:
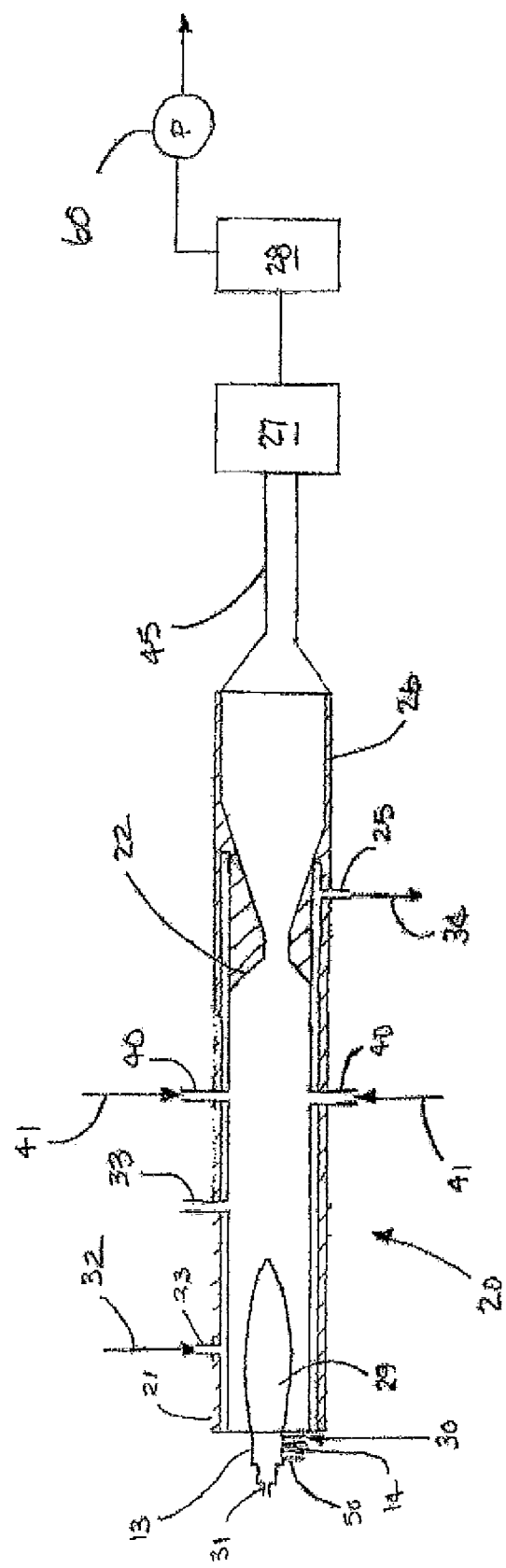
FIG. 2 is a partially schematic sectional view of an apparatus for producing ultrafine boron carbide particles including a feed line for liquid boron-containing and carbon-containing precursors of the boron carbide in accordance with certain embodiments of the present invention.

FIG. 2 is a partially schematic sectional diagram of an apparatus for producing ultrafine boron carbide particles in accordance with certain embodiments of the present invention. A plasma chamber 20 is provided that includes a liquid feed inlet 50 which, in the embodiment shown in FIG. 2, is used to introduce a mixture of liquid boron-containing precursor and liquid carbon-containing precursor into the plasma chamber 20. In another embodiment, the liquid feed inlet 50 may be replaced with separate inlets (not shown) for the liquid boron-containing precursor and the liquid carbon-containing precursor. Also provided is at least one carrier gas feed inlet 14, through which a carrier gas flows in the direction of arrow 30 into the plasma chamber 20. The carrier gas may act to suspend or atomize the liquid precursors in the gas, thereby producing a gas-stream with the entrained liquid precursors which flows towards plasma 29. Numerals 23 and 25 designate cooling inlet and outlet respectively, which may be present for a double-walled plasma chamber 20. In these embodiments, coolant flow is indicated by arrows 32 and 34.

In the embodiment depicted by FIG. 2, a plasma torch 21 is provided. The torch 21 may thermally decompose or vaporize the liquid boron-containing and carbon-containing precursors within or near the plasma 29 as the stream is delivered through the inlet of the plasma chamber 20, thereby producing a gaseous stream. As is seen in FIG. 2, the liquid precursors are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9,000 K.

A plasma can be produced with any of a variety of gases. This can give excellent control over any chemical reactions taking place in the plasma as the gas may be inert, such as argon, helium, or neon, reductive, such as hydrogen, methane, ammonia, and carbon monoxide, or oxidative, such as oxygen, nitrogen, and carbon dioxide. Inert or reductive gas mixtures may be used to produce ultrafine boron carbide particles in accordance with the present invention. In FIG. 2, the plasma gas feed inlet is depicted at 31.

As the gaseous product stream exits the plasma 29 it proceeds towards the outlet of the plasma chamber 20. An additional reactant, as described earlier, can optionally be injected into the reaction chamber prior to the injection of the quench streams. A supply inlet for the additional reactant is shown in FIG. 2 at 33.

As is seen in FIG. 2, in certain embodiments of the present invention, the gaseous stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams is not limited so long as they result in impingement of the quench streams 41 with each other within the gaseous stream, in some cases at or near the center of the gaseous stream, to result in the rapid cooling of the gaseous stream to control the particle size of the ultrafine boron carbide particles. This may result in a quenching of the gaseous stream through dilution.

In certain methods of the present invention, contacting the gaseous stream with the quench streams may result in the formation and/or control of the particle size of the ultrafine boron carbide particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

In certain embodiments, the converging member comprises a converging-diverging (De Laval) nozzle, such as that depicted in FIG. 2, which is positioned within the outlet of the plasma chamber 20. The converging or upstream section of the nozzle, i.e., the converging member, restricts gas passage and controls the residence time of the materials within the plasma chamber 20. It is believed that the contraction that occurs in the cross sectional size of the stream as it passes through the converging portion of nozzle 22 changes the motion of at least some of the flow from random directions, including rotational and vibrational motions, to a straight line motion parallel to the plasma chamber axis. In certain embodiments, the dimensions of the plasma chamber 20 and the material flow are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 is maintained at a vacuum pressure by operation of a vacuum producing device, such as a vacuum pump 60. Following passage through nozzle 22, the ultrafine boron carbide particles may then enter a cool down chamber 26.

As is apparent from FIG. 2, in certain embodiments of the present invention, the ultrafine boron carbide particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The liquid boron-containing and carbon-containing precursors may be injected under pressure (such as from 1 to 300 psi) through a small orifice to achieve sufficient velocity to penetrate and mix with the plasma. In addition, in many cases the injected liquid stream is injected normal (90° angle) to the flow of the plasma gases. In some cases, positive or negative deviations from the 90° angle by as much as 30° may be desired.

The high temperature of the plasma may rapidly decompose and/or vaporize the liquid precursors. There can be a substantial difference in temperature gradients and gaseous flow patterns along the length of the plasma chamber 20. It is believed that, at the plasma arc inlet, flow is turbulent and there is a high temperature gradient from temperatures of about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber 20 may be determined by the fluid properties of the plasma and moving gaseous stream. It should be sufficiently great to permit necessary gaseous flow, but not so large that recirculating eddies or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45° degree.) leading into the nozzle throat. The purpose of the nozzle throat is often to compress the gases and achieve sonic velocities in the flow.

The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE37,853 at col. 9, line 65 to col. 11, line 32, the cited portion of which being incorporated by reference herein.

The following examples are intended to illustrate certain embodiments of the present invention, and are not intended to limit the scope of the invention.

EXAMPLE 1

Boron carbide particles were produced using a DC thermal plasma reactor system similar to that shown in FIG. 2. The main reactor system included a DC plasma torch (Model SG-100 Plasma Spray Gun commercially available from Praxair Technology, Inc., Danbury, Conn.) operated with 80 standard liters per minute of argon carrier gas and 12 kilowatts of power delivered to the torch. A liquid precursor feed composition comprising the materials and amounts listed in Table 1 was prepared and fed to the reactor at a rate of 7 grams per minute through a gas assisted liquid nebulizer located about 0.5 inch down stream of the plasma torch outlet. At the nebulizer, 15 standard liters per minute of argon were delivered to assist in atomization of the liquid precursors. Following a 4 inch long reactor section, a plurality of quench stream injection ports were provided that included 6⅛ inch diameter nozzles located 60° apart radially. A 10 millimeter diameter converging-diverging nozzle was provided 4 inches downstream of the quench stream injection port. Quench argon gas was injected through the quench stream injection ports at a rate of 145 standard liters per minute.

TABLE 1

| Material | Amount |
| --- | --- |
| Trimethoxy Boroxine[1] | 640 grams |
| Acetone | 400 grams |

[1]Commercially available from Alfa Aesar, Ward Hill, Massachusetts.

Figure 3:
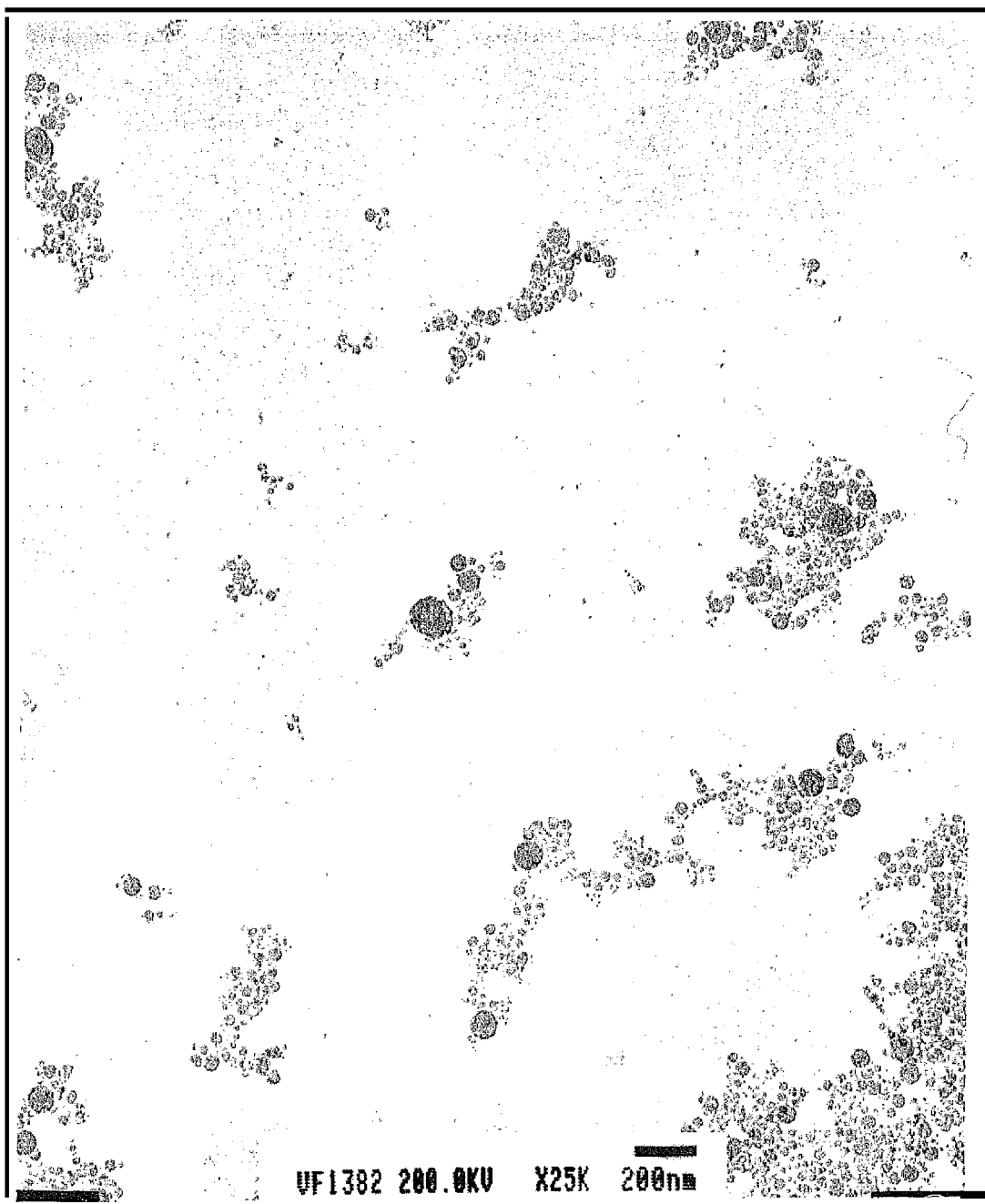
FIG. 3 is a photomicrograph of ultrafine boron carbide particles produced in accordance with an embodiment of the present invention.

The measured B.E.T. specific surface area of the produced material was 28 square meters per gram using a Gemini model 2360 analyzer (available from Micromeritics Instrument Corp., Norcross, Ga.), and the calculated equivalent spherical diameter was 85 nanometers. FIG. 3 is a micrograph of a TEM image of a representative portion of the particles (25,000× magnification). The micrograph was prepared by weighing out 0.2 to 0.4 grams of the particles and adding those particles to methanol present in an amount sufficient to yield an adequate particle density on a TEM grid. The mixture was placed in a sonicator for 20 minutes and then dispersed onto a 3 millimeter TEM grid coated with a uniform carbon film using a disposable pipette. After allowing the methanol to evaporate, the grid was loaded into a specimen holder which was then inserted into a TEM instrument.

EXAMPLE 2

Boron carbide particles from liquid precursors were prepared using the apparatus and conditions identified in Example 1, except that plasma was operated at 24 kilowatts of power delivered to the torch, a 7 millimeter diameter converging-diverging nozzle was used, and the feed materials and amounts used are listed in Table 2.

TABLE 2

| Material | Amount |
| --- | --- |
| Trimethyl Borate[2] | 1000 grams |
| Iso-Octane[3] | 34.4 grams |

[2]Commercially available from Alfa Aesar, Ward Hill, Massachusetts.
[3]Commercially available from Alfa Aesar, Ward Hill, Massachusetts.

Figure 4:
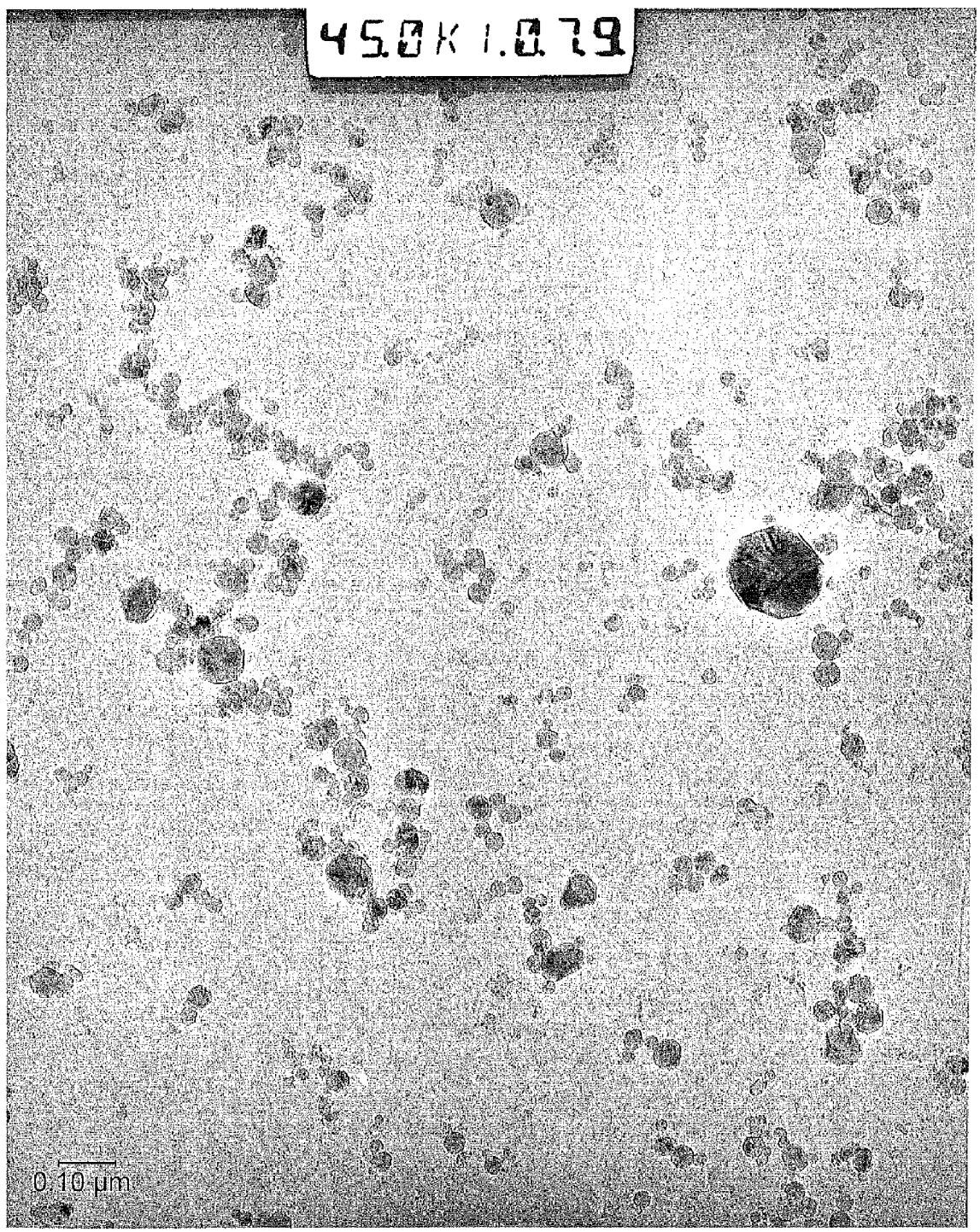
FIG. 4 is a photomicrograph of ultrafine boron carbide particles produced in accordance with another embodiment of the present invention.

The measured B.E.T. specific surface area of the produced material was 38 square meters per gram using a Gemini model 2360 analyzer (available from Micromeritics Instrument Corp., Norcross, Ga.), and the calculated equivalent spherical diameter was 63 nanometers. FIG. 4 is a TEM image of a representative portion of the particles (45,000× magnification) prepared in the same manner described in Example 1.

EXAMPLE 3

Boron carbide particles from liquid precursors were prepared using the apparatus and conditions identified in Example 2, except that the feed materials and amounts used are listed in Table 3.

TABLE 3

| Material | Amount |
| --- | --- |
| Trimethyl Borate | 1000 grams |
| N,N-Dimethylformamide[4] | 87.9 grams |

[4]Commercially available from Alfa Aesar, Ward Hill, Massachusetts.

Figure 5:
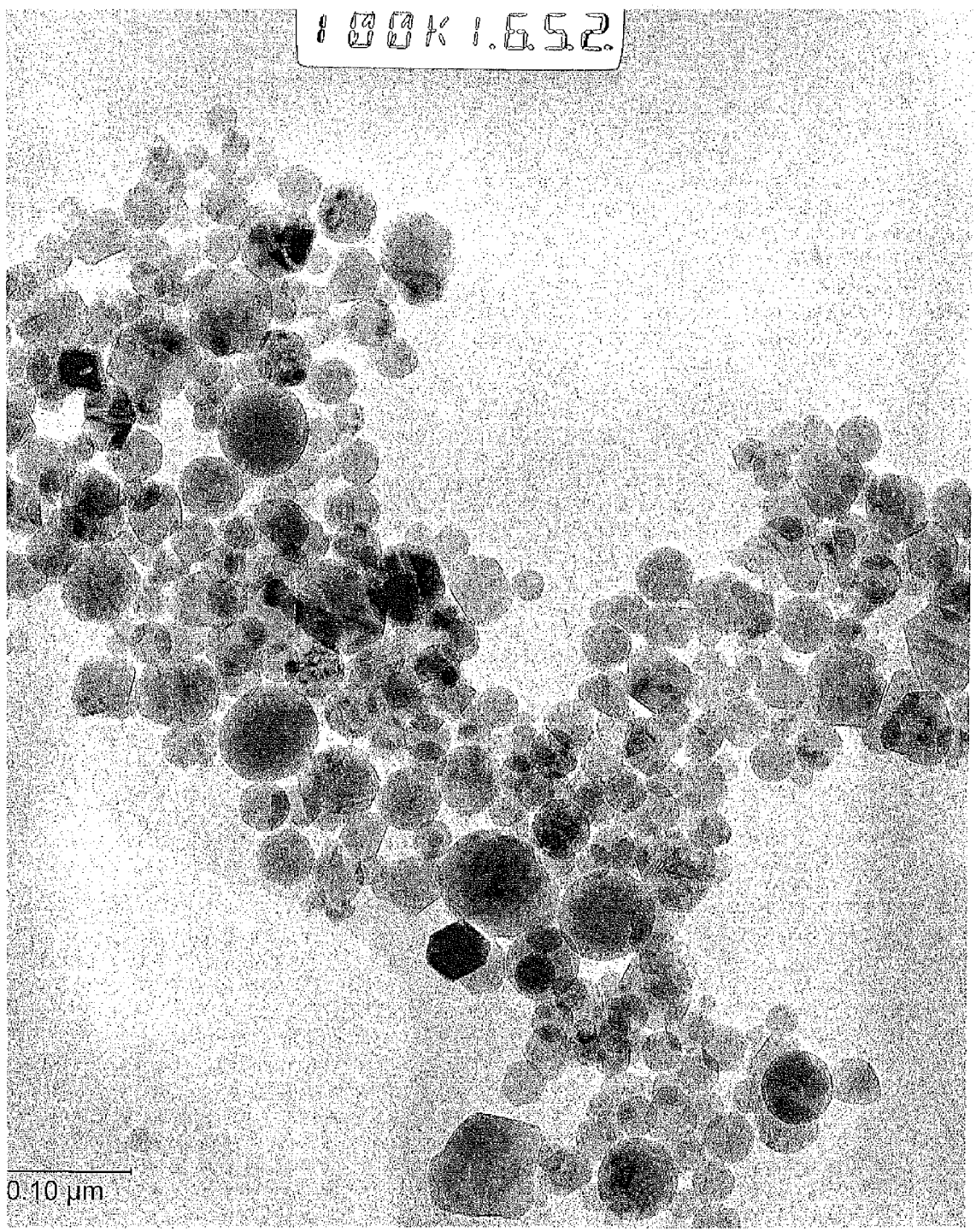
FIG. 5 is a photomicrograph of ultrafine boron carbide particles produced in accordance with a further embodiment of the present invention.
Figure 6:
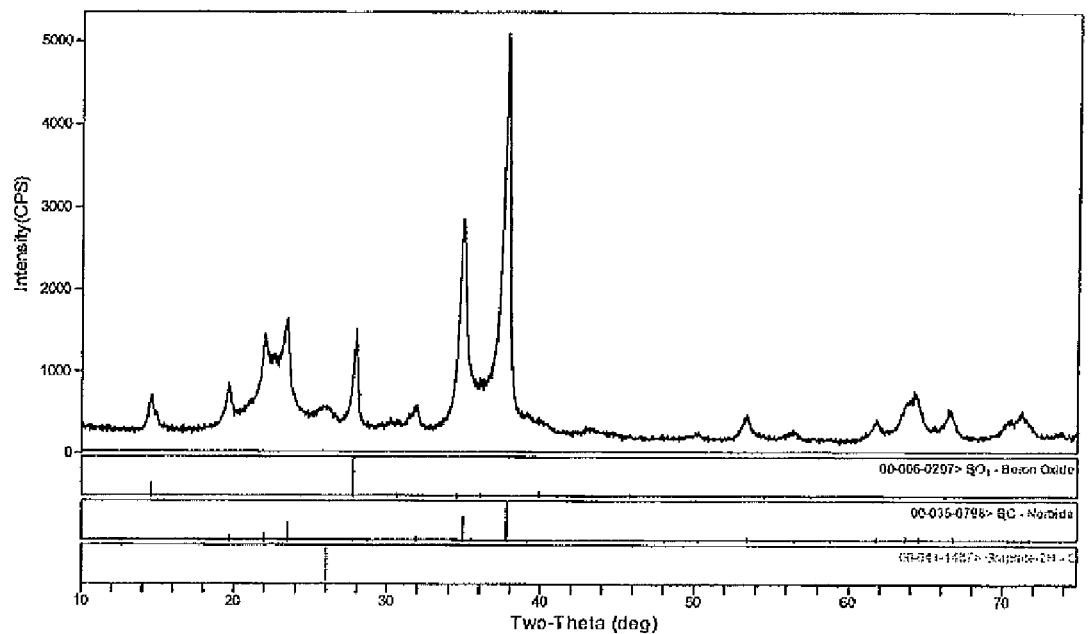
FIG. 6 is an X-ray diffraction pattern from the ultrafine boron carbide particles shown in FIG. 5.

The measured B.E.T. specific surface area of the produced material was 37 square meters per gram using a Gemini model 2360 analyzer (available from Micromeritics Instrument Corp., Norcross, Ga.), and the calculated equivalent spherical diameter was 64 nanometers. FIG. 5 is a TEM image of a representative portion of the particles (100,000× magnification) prepared in the same manner described in Example 1. FIG. 6 is an X-ray diffraction spectrum of the particles measured using an X-ray diffractometer (Philips X' Pert MPD model). The analysis indicated that the powder comprised crystalline boron carbide having a hexagonal crystal structure and small amounts of boron oxide and graphite.

EXAMPLE 4

Boron carbide particles from liquid precursors were prepared using the apparatus and conditions identified in Example 2, except that quench argon gas was injected at a rate of 290 standard liters per minute, and the feed materials and amounts are listed in Table 4.

TABLE 4

| Material | Amount |
| --- | --- |
| Trimethyl Borate | 1000 grams |
| N,N-Dimethylformamide | 93.4 grams |
| Tetramethoxysilane[5] | 22.9 grams |

[5]Commercially available from Alfa Aesar, Ward Hill, Massachusetts.

Figure 7:
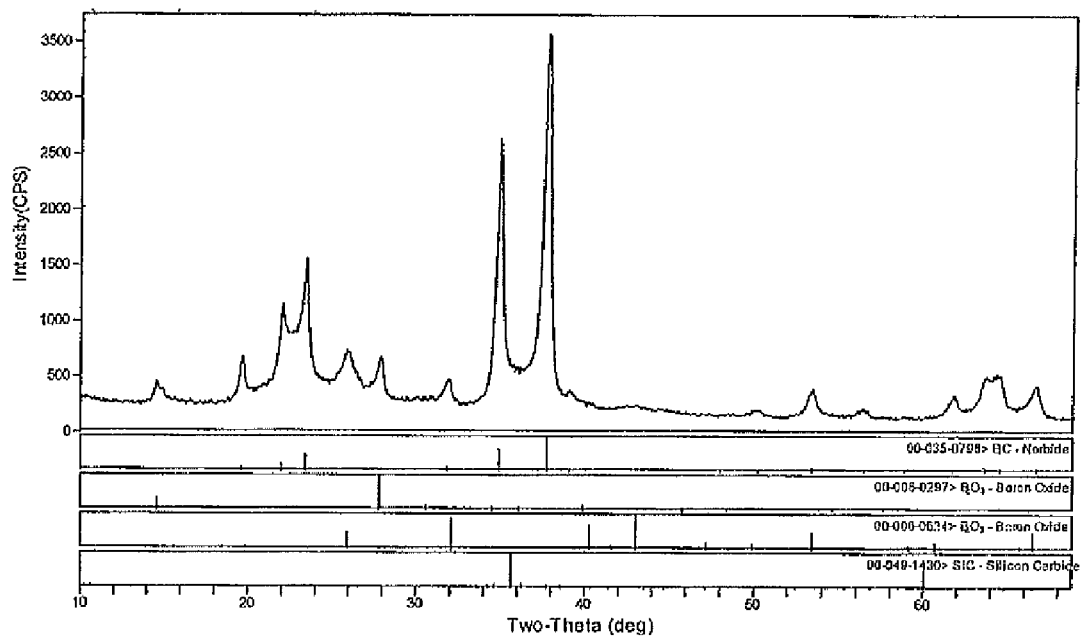
FIG. 7 is an X-ray diffraction pattern from ultrafine boron carbide particles produced in accordance with another embodiment of the present invention.

The measured B.E.T. specific surface area of the produced material was 33 square meters per gram using a Gemini model 2360 analyzer (available from Micromeritics Instrument Corp., Norcross, Ga.), and the calculated equivalent spherical diameter was 72 nanometers. FIG. 7 is an X-ray diffraction spectrum of the particles measured using an X-ray diffractometer (Philips X' Pert MPD model). The analysis indicated that the powder comprised crystalline boron carbide having a hexagonal crystal structure.

EXAMPLE 5

Boron carbide particles from liquid precursors were prepared using the apparatus and conditions identified in Example 4, except that the feed materials and amounts are listed in Table 5.

TABLE 5

| Material | Amount |
| --- | --- |
| Trimethyl Borate | 1000 grams |
| Iso-Octane | 35.8 grams |
| Tetramethoxysilane | 22.9 grams |

Figure 8:
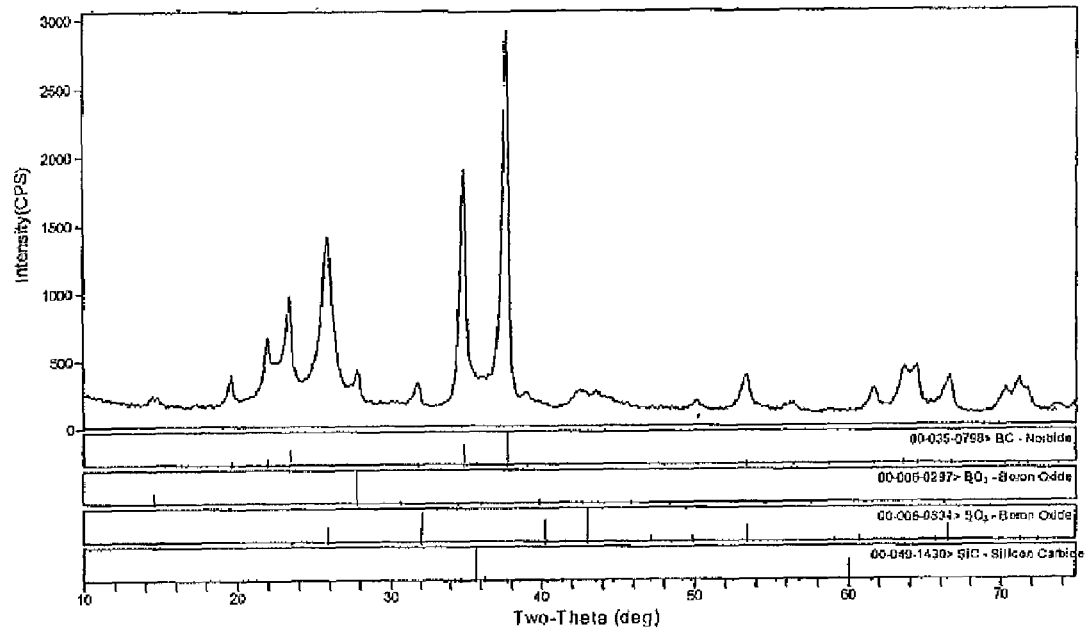
FIG. 8 is an X-ray diffraction pattern from ultrafine boron carbide particles produced in accordance with a further embodiment of the present invention.

The measured B.E.T. specific surface area of the produced material was 39 square meters per gram using a Gemini model 2360 analyzer (available from Micromeritics Instrument Corp., Norcross, Ga.), and the calculated equivalent spherical diameter was 61 nanometers. FIG. 8 is an X-ray diffraction spectrum of the particles measured using an X-ray diffractometer (Philips X' Pert MPD model). The analysis indicated that the powder comprised crystalline boron carbide.

EXAMPLE 6

Boron carbide particles from liquid precursors were prepared using the apparatus and conditions identified in Example 5, except that the feed materials and amounts are listed in Table 6.

TABLE 6

| Material | Amount |
| --- | --- |
| Trimethyl Borate | 1000 grams |
| Iso-Octane | 17.2 grams |
| Tetraethoxysilane[6] | 83.5 grams |

[6]Commercially available from Alfa Aesar, Ward Hill, Massachusetts.

Figure 10:
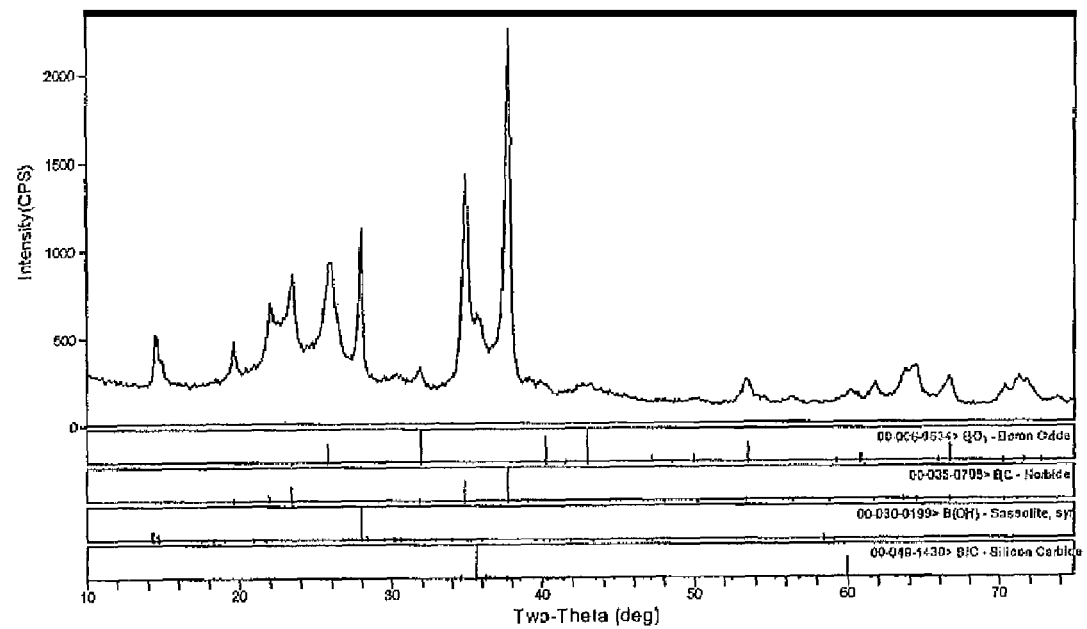
FIG. 10 is an X-ray diffraction pattern from the ultrafine boron carbide particles shown in FIG. 9.
Figure 9:
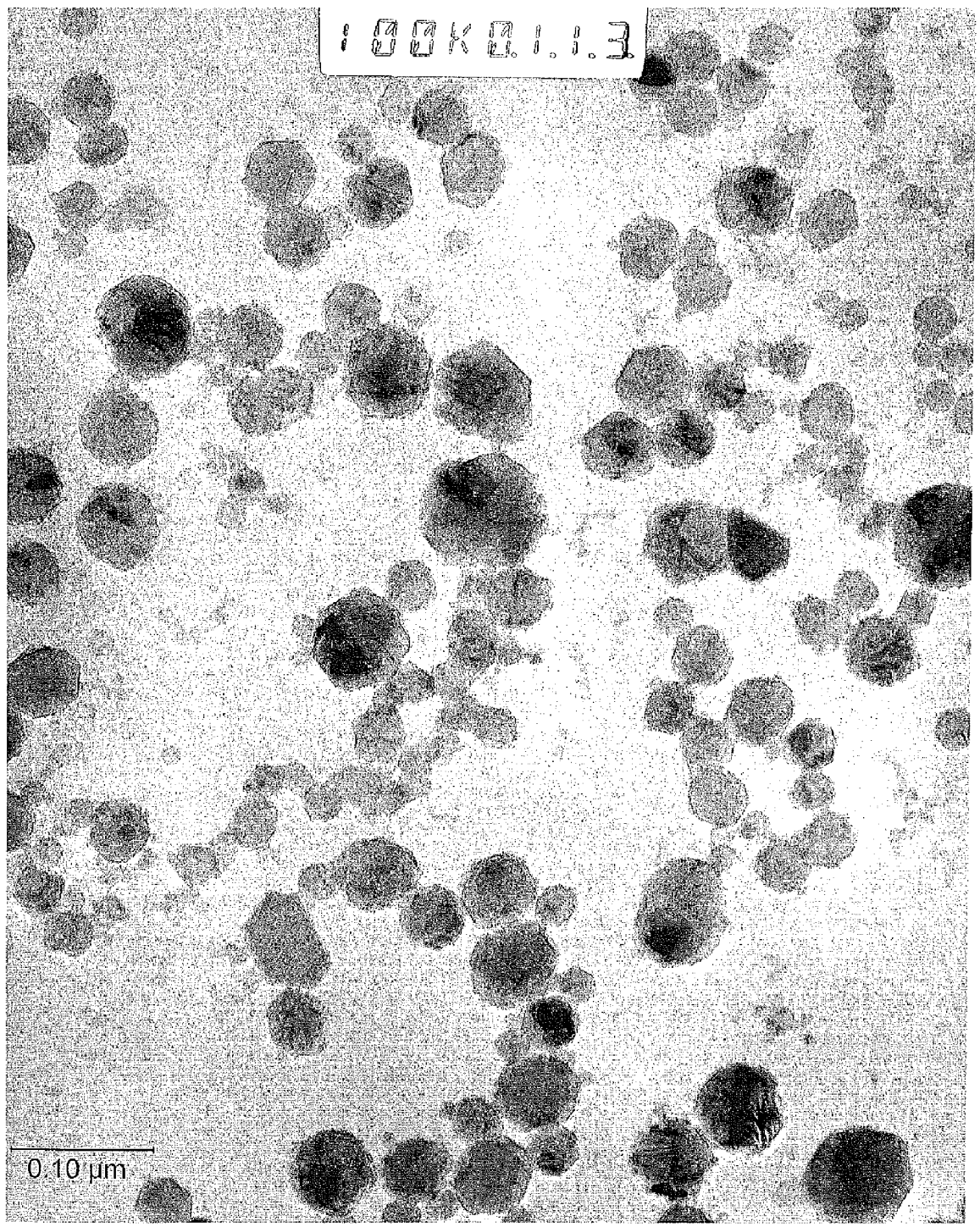
FIG. 9 is a photomicrograph of ultrafine boron carbide particles produced in accordance with another embodiment of the present invention.

The measured B.E.T. specific surface area of the produced material was 47 square meters per gram using a Gemini model 2360 analyzer (available from Micromeritics Instrument Corp., Norcross, Ga.), and the calculated equivalent spherical diameter was 51 nanometers. FIG. 9 is a TEM image of a representative portion of the particles (100,000× magnification) prepared in the manner described in Example 1. FIG. 10 is an X-ray diffraction spectrum of the particles measured using an X-ray diffractometer (Philips X' Pert MPD model). The analysis indicated that the powder comprised crystalline boron carbide and small amounts of boron oxide, silicon carbide, and graphite.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method for making ultrafine boron carbide particles comprising:
   introducing a liquid boron-containing precursor comprising a borate ester and a carbon-containing precursor into a plasma;
   heating the precursors by the plasma to form the ultrafine boron carbide particles from the precursors; and
   collecting the ultrafine boron carbide particles.

2. The method of claim 1, wherein the borate ester comprises trimethylboroxine, trimethylborate, triethylborate, or a combination thereof.

3. The method of claim 1, wherein the liquid boron-containing precursor comprises trimethylboroxine.

4. The method of claim 1, wherein the liquid boron-containing precursor comprises trimethylborate.

5. The method of claim 1, wherein the carbon-containing precursor is liquid.

6. The method of claim 5, wherein the liquid carbon-containing precursor comprises aliphatic carbon atoms, aromatic carbon atoms, or a combination thereof.

7. The method of claim 5, wherein the liquid carbon-containing precursor comprises an organic liquid.

8. The method of claim 7, wherein the organic liquid has a C:H atomic ratio greater than 1:3.

9. The method of claim 5, wherein the liquid carbon-containing precursor comprises acetone, iso-octane, toluene, or a combination thereof.

10. The method of claim 5, wherein the liquid carbon-containing precursor comprises acetone.

11. The method of claim 5, wherein the liquid carbon-containing precursor comprises iso-octane.

12. The method of claim 1, further comprising mixing the liquid boron-containing precursor and carbon-containing precursor before the introduction into the plasma.

13. The method of claim 1, further comprising contacting the liquid boron-containing precursor and carbon-containing precursor with a carrier gas before the introduction into the plasma.

14. The method of claim 1, further comprising introducing an additional reactant into the plasma.

15. The method of claim 14, wherein the additional reactant comprises nitrogen.

16. The method of claim 1, wherein the ultrafine boron carbide particles have an average particle size of less than 100 nm.

17. The method of claim 1, wherein the ultrafine boron carbide particles comprise $B_4C$, $B_{13}C_2$, $B_8C$, $B_{10}C$, $B_{25}C$, or a combination thereof.

18. The method of claim 1, wherein the ultrafine boron carbide particles comprise $B_4C$.

19. The method of claim 1, wherein the carbon-containing precursor comprises a source of nitrogen.

20. A method claim for making ultrafine boron carbide particles comprising:
   introducing a liquid boron-containing precursor and a liquid carbon-containing precursor comprising an organic liquid into a plasma;
   heating the precursors by the plasma to form the ultrafine boron carbide particles from the precursors; and
   collecting the ultrafine boron carbide particles,
   wherein the organic liquid has a C:O atomic ratio greater than 2:1.

21. A method for making ultrafine boron carbide particles comprising:
   introducing a liquid boron-containing precursor, a carbon-containing precursor, and an additional reactant into a plasma;
   heating the precursors by the plasma to form the ultrafine boron carbide particles from the precursors; and
   collecting the ultrafine boron carbide particles,
   wherein the additional reactant comprises silicon.

* * * * *